United States Patent [19]

Harmant

[11] 4,020,598
[45] May 3, 1977

[54] METHOD OF MEASURING THE RADIUS OF A ROTATING GRINDING WHEEL AND DEVICE THEREFOR

[75] Inventor: Michel Engineer Harmant, Neris-les-Bains, France

[73] Assignee: Etablissements Zelant Gazuit, France

[22] Filed: Dec. 5, 1975

[21] Appl. No.: 638,055

[30] Foreign Application Priority Data
Dec. 6, 1974 France .................. 74.40088

[52] U.S. Cl. ............... 51/34 R; 51/134.5 R; 51/165.71; 51/165.87; 51/281 R
[51] Int. Cl.[2] ............... B24B 7/02; B24B 49/00
[58] Field of Search ..... 51/134.5 R, 165 R, 165.71, 51/165.87, 99, 165.77, 34 D–34 G, 281 R, 34 R

[56] References Cited
UNITED STATES PATENTS

| | | | |
|---|---|---|---|
| 2,896,377 | 7/1959 | Walking | 51/134.5 R |
| 3,100,954 | 8/1963 | DiLella | 51/165.77 |
| 3,641,709 | 2/1972 | Gazuit | 51/99 |
| 3,898,440 | 8/1975 | Fukuma | 51/165.71 |

*Primary Examiner*—Harold D. Whitehead
*Attorney, Agent, or Firm*—Amster & Rothstein

[57] ABSTRACT

A method of and a device for measuring the radius of a grinding wheel during the rotation thereof, said grinding wheel being supported by at least one pivoting arm of predetermined length and urged against an object to be ground having predetermined dimensions, wherein the value of the angle formed between said pivoting arm in relation to a fixed direction is measured, and an electric signal in relation to the value of the measured angle is generated and fed to a computer together with electric signals corresponding to predetermined fixed parameters for generating from said signals an electric signal proportional to the radius of the grinding wheel. This invention is applicable notably to the control of the speed of rotation of the grinding wheel as a function of the radius thereof which decreases as a consequence of the normal wear of the grinding wheel.

14 Claims, 6 Drawing Figures

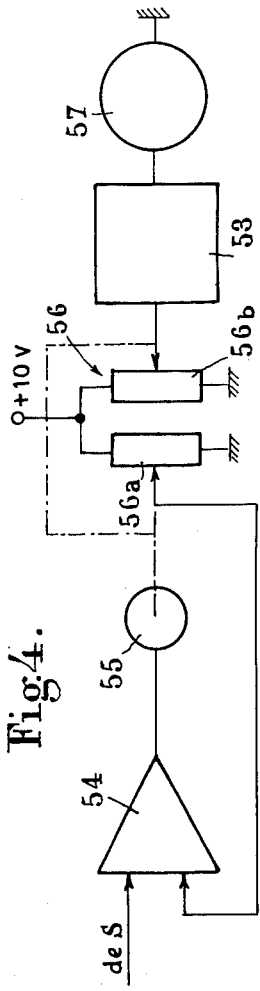
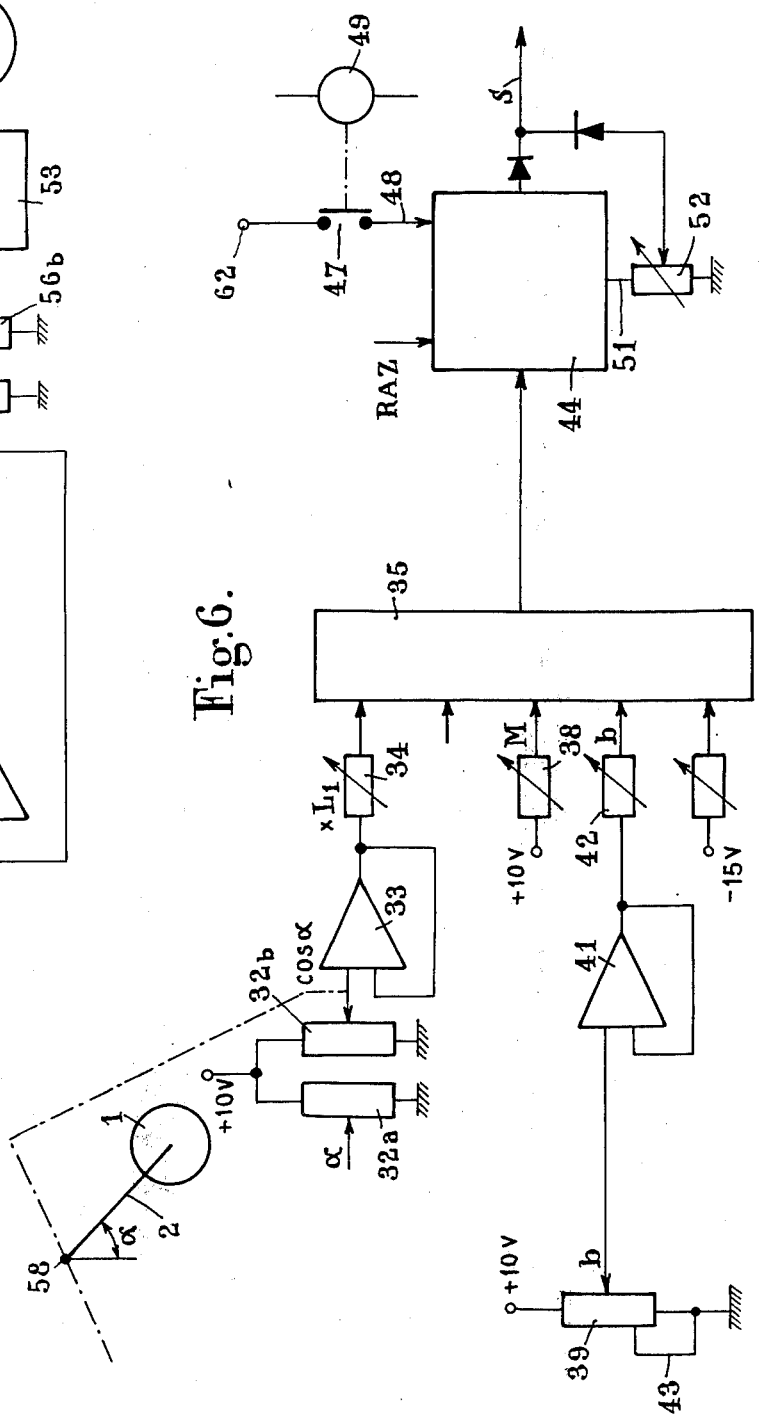

METHOD OF MEASURING THE RADIUS OF A ROTATING GRINDING WHEEL AND DEVICE THEREFOR

BACKGROUND OF THE INVENTION

1. Field of the Invention

The present invention relates in general to a method of and a device for measuring the radius of a rotating grinding wheel without stopping the wheel which is supported by at least one pivoting arm of predetermined length and urged against an object to be ground having predetermined dimensions.

This invention is applicable more particularly but not exclusively to the measurement of the radius of a grinding wheel in a machine for removing cracks from billets, or like machines.

In metallurgical processes, after a shaping or treatment operation, a metal product displays a given surface condition or appearance characterised by the distribution, shape, depth and amplitude of its irregularities, and also by its light-reflecting capacity, structural condition and physico-chemical and mechanical properties. Furthermore, in some instances surface defects such as cracks, scratches, inclusions, oxide layers, burrs, blisters, chinks, etc... are observed. A surface cleaning operation, notably for removing cracks on ingots and semiproducts such as blooms, slabs, billets, etc. of steel, notably hard steel or alloy steels, is performed as a rule by grinding. Now in this grinding operation it is necessary to constantly measure the diameter or radius of the grinding wheel, which varies with time due to normal wear, in order to control the rotational speed of the grinding wheel according to the unavoidable variation in the diameter or radius thereof, and thus keep the peripheral velocity of the grinding wheel at a substantially constant value.

2. Description of the Prior Art.

It has been proposed to measure the diameter of a grinding wheel by means of a radio-active power source and of a probe associated with flicker meters or scintillation counters. A device of this known type operates as follows: the wheel acts as a screen between the source and the counters, so that the greater the wheel wear, the smaller the screen and the greater the amount of radiation picked up by the counters. Electronic means are thus enabled to deliver a voltage proportional to the diameter or radius of the grinding wheel. The order of magnitude of this voltage variation ranges from −3 V for a new grinding wheel to −10 V for a worn wheel. Nevertheless, this prior art arrangement is objectionable on account of the relatively long time period necessary for stabilizing the system (about 15 minutes), the poor stability of the output voltage, the poor resistance of the probe to shocks and vibration, and also the difficulties encountered in many countries for obtaining a proper certification of the source of radio-active power and the necessity of providing efficient safety means in case of faulty operation of one or several counters.

SUMMARY OF THE INVENTION

It is the essential object of the present invention to avoid the above-listed inconveniences by providing a method of and means for measuring the radius (or diameter), varying as a function of wear, of a rotating grinding wheel without having to stop the rotation of the grinding wheel and without deriving data from the wheel itself.

It is another object of this invention to provide a method and means of the type broadly set forth hereinabove which can be used for controlling the velocity of the grinding wheel of a grinding wheel of a grinding machine, for example a billet-type crack removing machine.

It is a complementary object of this invention to provide a method and means of the type disclosed hereinabove wherein the radius of the grinding wheel can be measured at very short time intervals whereby, considering the relatively slow rate of wear of the grinding wheel, the measurement of the wheel radius can be assimilated to a continuous measurement.

To this end, the invention provides a method of the type broadly set forth above, comprising the steps of measuring the value of the angle formed by said pivoting arm in relation to a fixed direction, generating an electric signal in relation to the measured angle value, and feeding said electric signal to a computer together with other electric signals corresponding to predetermined fixed parameters in order to deliver an electric signal proportional to the radius of said grinding wheel.

BRIEF DESCRIPTION OF THE DRAWINGS

Now the present invention will be described in detail with reference to the attached drawings in which:

FIG. 4 illustrates a block diagram of a control circuit utilizing the signal generated in the circuit of FIG. 2 for controlling the velocity of rotation of a grinding wheel driving motor.

FIG. 6 illustrates the block diagram of a device according to this invention for measuring the radius of the grinding wheel in the machine shown in FIG. 5.

DESCRIPTION OF THE PREFERRED EMBODIMENTS.

Figure 1:
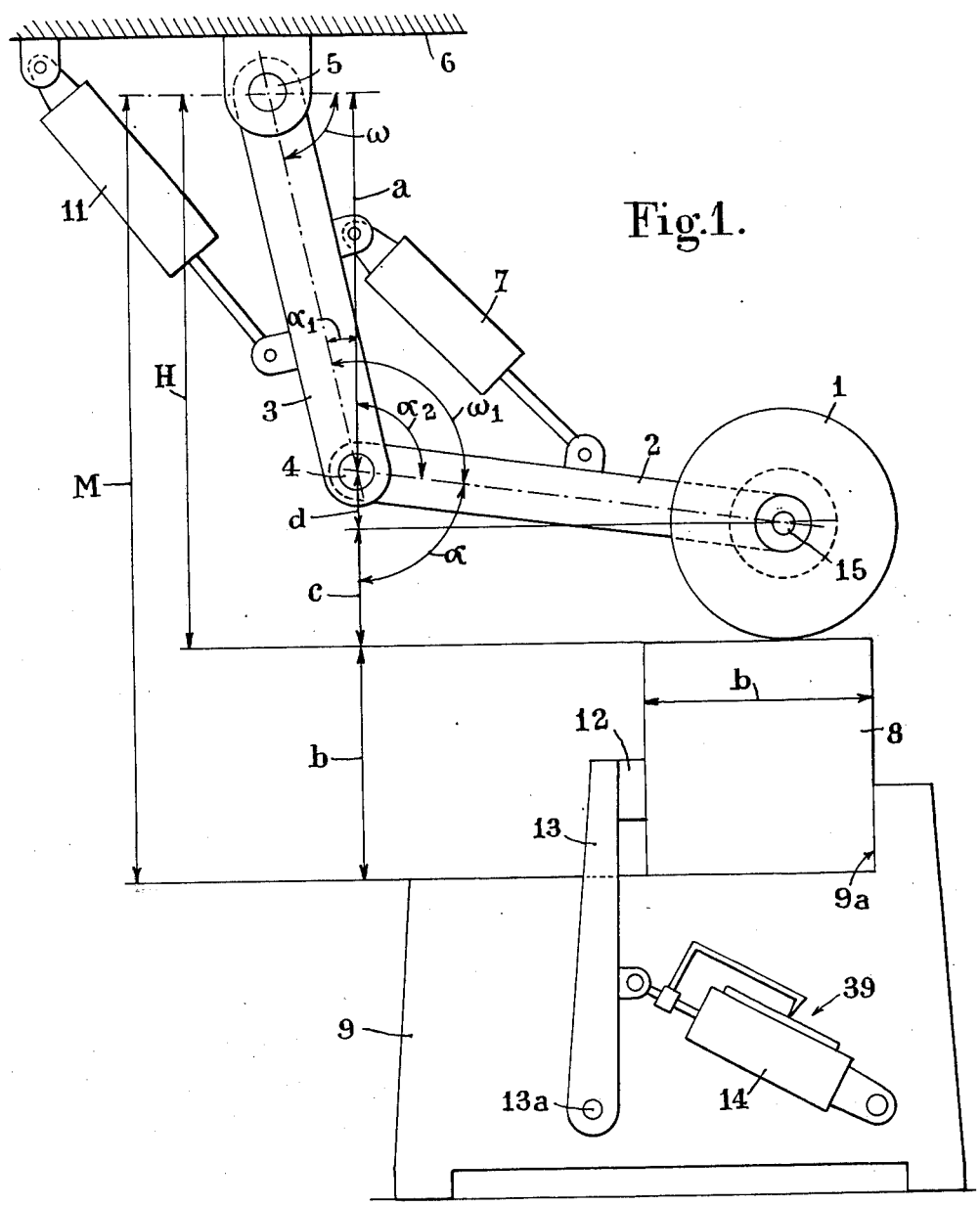
FIG. 1 illustrates diagrammatically a first embodiment of a billet-type crack-removing machine to which the present invention is applicable.

Reference will firstly be made to FIG. 1 illustrating diagrammatically a conventional billet-type crack-removing machine comprising a grinding wheel 1 rotatably mounted to one end of a first arm 2 having its opposite end pivoted to one end of another arm 3. The opposite end of the second arm 3 is pivoted through a pivot shaft 5 to a fixed frame structure 6. The grinding wheel 1 is rotatably driven from a suitable motor (not shown). A double acting hydraulic or pneumatic cylinder 7 having its end connected to arms 2 and 3, respectively, is adapted to urge the wheel 1 against the object to be ground, for example a billet 8, which is supported by a working table 9. The cylinder 7 is also adapted to raise the grinding wheel 1 to permit, at the end of the grinding operation, the removal of the billet 8 and the replacement thereof by another billet on the table 9.

Another double acting hydraulic or pneumatic cylinder 11 having its ends connected to the frame structure 6 and arm 3, respectively, is adapted, when actuated, to move the grinding wheel 1 on the top surface of billet 8.

A holding or clamping bar 12 is provided for pressing the billet 8 against a shoulder 9a of said table 9 in order firmly to hold said billet 8 in position during the grinding operation. Each end of bar 12 is connected to one end of an arm 13, respectively, which has its other end pivoted to one side of table 9. A hydraulic or pneumatic cylinder 14 is connected between each arm 13 and table 9 to urge, when actuated, the bar 12 against the billet 8.

In FIG. 1 the angles formed by the arm 3 with the horizontal and the vertical are denoted $\omega$ and $\alpha_1$ respectively, and the supplemental angles formed by the arm 2 to the vertical are denoted $\alpha_2$ and $\alpha$. The reference letter $b$ designates the height and width of the billet 8 which, as known per se, is square-sectioned. $c$ designates the radius of the grinding wheel 1. $d$ designates the vertical distance between the axis 15 of grinding wheel 1 and the axis of shaft 4 pivotally interconnecting the two arms 2 and 3. $a$ designates the vertical distance between the axes of shafts 4 and 5. M designates the fixed vertical distance between the top surface of table 9 and the axis of shaft 5. Finally, H designates the vertical distance between the top surface of billet 8 and the axis of shaft 5. From the above-defined parameters, it is possible to calculate the value of the radius $c$ of wheel 1. In fact, the following relationships exist between these parameters:

$$c = H - d - a$$
$$H = M - b$$
$$d = L_1 \cos \alpha$$
$$a = L_2 \sin \omega$$

$L_1$ and $L_2$ designate the length of arm 2, measured between the axis of shaft 4 and axis 15, and the length of arm 3 measured between axes of shafts 4 and 5, respectively. From the above equations the following equation may be obtained:

$$c = M - b - L_1 \cos \alpha - L_2 \sin \omega \qquad (1)$$

Since in actual practice it is rather difficult to measure the angle $\alpha$ between arm 2 and the vertical, it is preferred to measure the angle $\omega_1$ formed between the two arms 2 and 3, which can be measured without difficulty, as will be seen presently. Now angle $\omega_1$ is related to the other angles through the following relationships:

$$\alpha = \pi - \alpha_2$$
$$\omega_1 = \alpha_1 + \alpha_2$$

hence $$\alpha_2 = \omega_1 - \alpha_1$$
$$\omega + \alpha_1 = (\pi/2)$$

hence $$\alpha_1 = (\pi/2) - \omega$$

therefore $$\alpha = \pi - \left[\omega_1 - \left(\frac{\pi}{2} - \omega\right)\right] = \frac{3\pi}{2} - \omega_1 - \omega \qquad (2)$$

$$c = M - b - L_1 \cos\left(\frac{3\pi}{2} - \omega_1 - \omega\right) - L_2 \sin \omega \qquad (3)$$

As will be explained more in detail presently, it is a simple matter to measure the angles $\omega_1$ and $\omega$. On the other hand the parameters M, $L_1$ and $L_2$ are fixed known parameters of the grinding machine, and the height $b$ of the billet 8 is also known or can easily be measured as will be seen presently. Therefore, the radius $c$ of grinding wheel 1 can be calculated very easily from the above formula (3). However, the corners of billet 8 are rounded (this is not shown in the diagrammatic illustration of FIG. 1), and some steps must be taken to cause the measurement to be valid only when the grinding wheel 1 is so positioned that the point of contact between the wheel 1 and the top surface of billet 8 lies in the flat portion of said top surface, not in rounded corners or edges thereof. As will be seen presently, this amounts to validate the measurement only for a predetermined value $\omega_0$ of angle $\omega$. For this value $\omega_0$ of angle $\omega$ the arm 3 extends in a predetermined fixed direction so that the measurement of the radius of wheel 1 consists simply in measuring the value of the angle $\omega_1$ formed between the arm 2 and the above-mentioned predetermined direction.

Figure 2:
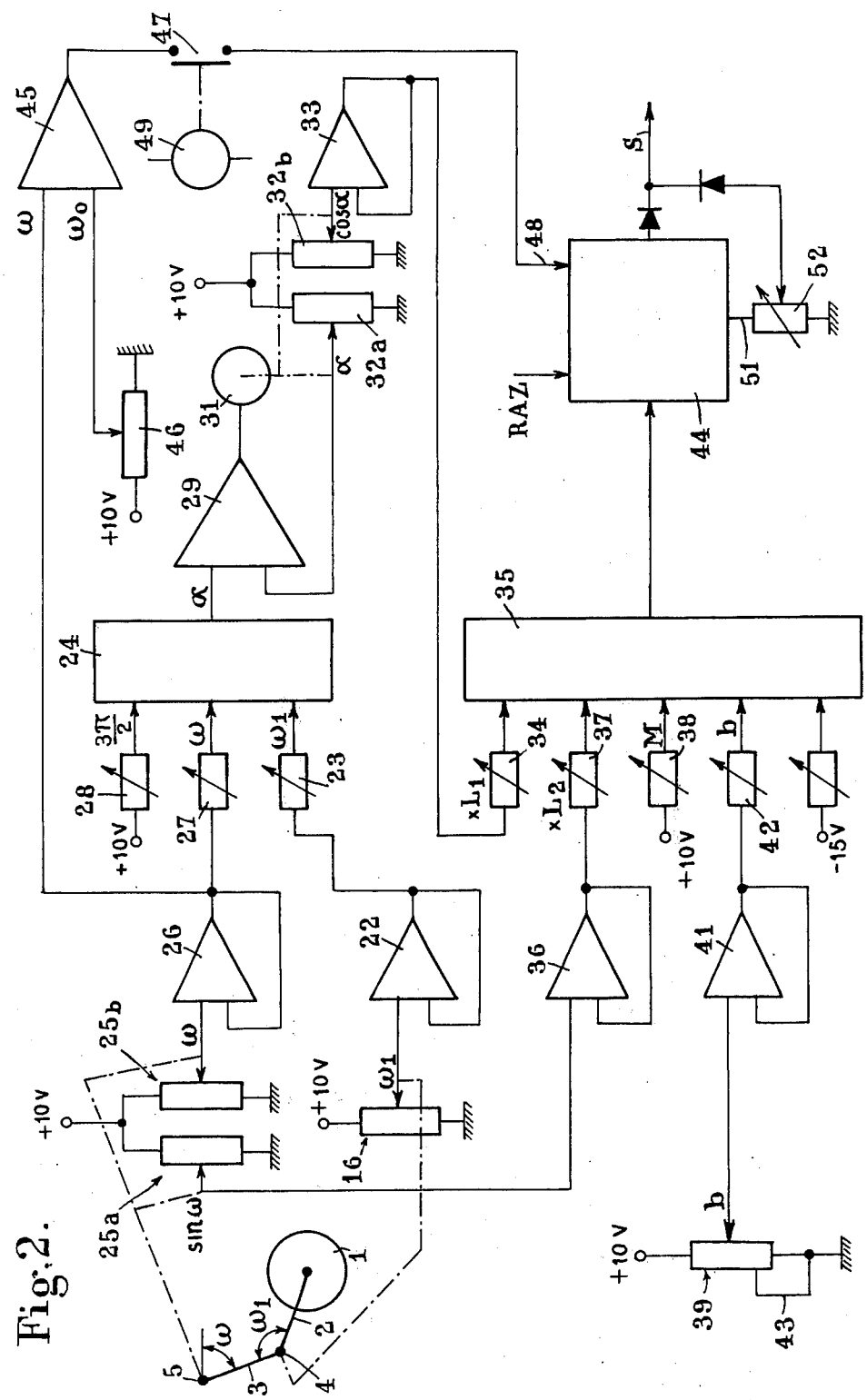
FIG. 2 is a block diagram illustrating a device according to the invention for measuring the radius of the grinding wheel of the machine illustrated in FIG. 1.
Figure 3:
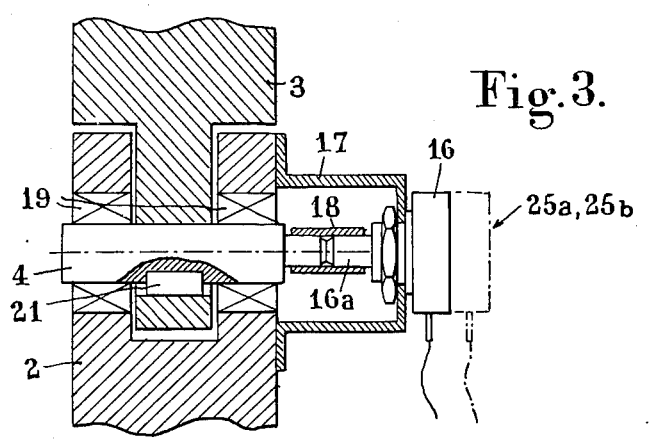
FIG. 3 is a fragmentary view showing on a larger scale a detail of the machine illustrated in FIG. 1 for measuring an angle and generating and electric signal in relation with the measured angular value.

Reference will now be made to FIG. 2 illustrating the block diagram of a device according to this invention for generating and electric signal proportional to the radius of the grinding wheel. In FIG. 2 the reference numeral 16 designates a potentiometer of which the movable contact is mechanically connected to the pivot axis 4 interconnecting the arms 2 and 3. As shown in FIG. 3, the potentiometer 16 may consist of a conventional rotary potentiometer having its casing mounted on a support or bracket 17 secured to arm 2 through any suitable fastening means, such as screws, not shown, so that the rotating shaft 16a of the potentiometer 16 be in axial alignment with the pivot shaft 4. The shafts 16a and 4 may be coupled to each other through any suitable means, such as a coupling sleeve 18. Shaft 4 is rotatably mounted in the arm 2 by means of a pair of suitable bearings 19 and is rigidly connected with the arm 3 by means of a key 21. With this arrangement, any relative rotational movement between the arms 2 and 3 causes a corresponding movement of rotation of shaft 16a of potentiometer 16 in relation to the potentiometer casing. Thus, by selecting a potentiometer having a resistance value (measured between one end of the potentiometer and the movable or sliding contact thereof carried by its rotating shaft 16a) which varies linearly as a function of the angular position of said rotating shaft 16a, and by securing the potentiometer 16 on its support or bracket 17, or the latter on arm 2, with a suitable initial angular setting, it is possible to cause the above-mentioned resistance of potentiometer 16 to vary in proportion to the value of the angle formed between said arms 2 and 3, i.e. to the value of said angle $\omega_1$.

Referring again to FIG. 2, it will be seen that the potentiometer 16 has one end electrically connected to a source of direct current, for example + 10 V, and the other end thereof grounded. Thus, if the resistance of the portion of potentiometer 16 extending between the sliding contact thereof and the ground varies in proportion to the angle $\omega_1$, a voltage proportional to the value of this angle $\omega_1$ will be obtained at the sliding contact of the potentiometer 16. The voltage derived from the sliding contact of potentiometer 16 is fed via an amplifier 22 and an adjustable resistor 23 to a first input of a computer unit 24.

A pair of mechanically interconnected potentiometers 25a, 25b are electrically connected in parallel on the one hand to a source of direct current of, say, + 10 V, and on the other hand to the ground. The pair of potentiometers 25a and 25b may consist of conventional dual rotary potentiometer having its two sliding contacts connected to a single rotating shaft common to both potentiometers. This single rotating shaft is connected mechanically to the shaft 5 pivotally interconnecting the arm 3 to the frame structure 6. As illustrated in dash and dot lines in FIG. 3, the potentiometers 25a, 25b may be mounted exactly like the potentiometer 16. However, in the present instance the resistance of the potentiometers 25a and 25b respectively are so designed that they do not vary in the same manner. More precisely, the resistance of potentiometer 25b, as measured between its sliding contact and its grounded end, is selected to vary linearly, and the resistance of potentiometer 25a, as measured between its sliding contact and its grounded end, is selected to vary sinusoidally (or cosinusoidally; this choice is only a matter of initial angular setting of the potentiometer, since the two sine and cosine functions are deducted from each other through an angular shift of ($\pi/2$). Thus by setting the potentiometers 25a and 25b in a suitable angular position on the arm 3, it is possible to cause the resistance value of potentiometer 25b, as measured between its sliding contact and the ground, to vary in proportion to the angle $\omega$, and to cause the resistance value of potentiometer 25a, as measured between its sliding contact and the ground, to vary in proportion to the sine of angle $\omega$. Therefore, a voltage proportional to the angle $\omega$ and a voltage proportional to sin $\omega$ will be available on the sliding contacts of potentiometers 25b and 25a, respectively. The voltage proportional to angle $\omega$, which is available at the sliding contact of potentiometer 25b, is fed to a second input of computer unit 24 via an amplifier 26 and a variable resistor 27. Both resistors 23 and 27 are so adjusted that the data concerning said angles $\omega_1$ and $\omega$ are amplified in the same proportions. The computer unit 24 comprises a third input to which an electric signal of a value proportional to $\pi/2$ is fed. This electric signal may be obtained for example from a d.c. source such as + 10 V through a variable resistor 28.

The computer unit 24 may consist of a conventional algebraic adder adapted to calculate the value of angle $\alpha$ according to the above formula (2). The output of this algebraic adder 24 will thus deliver a direct-current voltage proportional to the value of angle $\alpha$.

As clearly evidenced by the above formulae (1) and (3) the cosine of angle $\alpha$ must also be calculated to obtain the value of the radius c of grinding wheel 1. This can be accomplished for example by means of the electro-mechanical device described hereinafter. The output signal from the algebraic adder 24 is fed to one of the two inputs of a comparator 29 of which the output signal is fed to a re-copying motor 31. The shaft of this motor 31 is coupled mechanically to the rotating shaft of a dual rotary potentiometer comprising two resistive tracks 32a and 32b. These resistive tracks 32a and 32b are electrically connected in parallel between the ground and a source of d.c. of, say, + 10 V. The dual rotary potentiometer 32a, 32b is of a type similar to the dual rotary potentiometer 25a, 25b. More particularly, the resistance of track 32a as measured between the sliding contact and the grounded end thereof varies linearly and in proportion to the value of angle $\alpha$, and the resistance of track 32b, as measured between the sliding contact and the grounded end thereof, varies in proportion to the cosine of angle $\alpha$. The voltage available at the sliding contact associated with track 32a is thus proportional to the value of angle $\alpha$ and fed to the second input of comparator 29. Under these conditions, when the angle $\alpha$ varies, the comparator 29 and re-copying motor 31 reproduce at each moment the angle $\alpha$ and at the same time a d.c. voltage proportional to the cosine of angle $\alpha$ is obtained at the sliding contact associated with track 32b. This last-mentioned d.c. voltage is fed via an amplifier 33 and a multiplying circuit 34 to a first input of a computer 35. The multiplying circuit 34, consisting for example of a variable resistor, is so adjusted that the total gain of the circuit comprising said amplifier 33 and variable resistor 34 will be of such value that the voltage fed to the first input of computer 35 be proportional to the product $L_1 \cos \alpha$.

Likewise, the d.c. voltage available at the sliding contact associated with track 25a of the dual rotary potentiometer 25a, 25b is fed through an amplifier 36 and a multiplying circuit 37 to a second input of computer 35. The multiplying circuit 37 comprises a variable resistor, which is so adjusted that the total gain of the circuit comprising said amplifier 36 and said resistor 37 will be of such value that the voltage fed to the second input of computer 35 be proportional to the product $L_2 \cdot \sin \omega$. The computer 35 has a third input to which a d.c. voltage proportional to the above-defined value M is fed. This d.c. voltage may be obtained by means of a variable resistor 38 connected to a source of d.c. voltage, for instance + 10 V.

The computer 35 further has a fourth input receiving a d.c. voltage proportional to the billet height b. This last-mentioned d.c. voltage may be derived from a potentiometer 39 connected between the ground and a source of d.c. voltage, for example a + 10 V source, the sliding contact of this potentiometer being connected to the fourth input of computer 35 via an amplifier 41 and a variable resistor 42, the latter being so adjusted that the total gain of the circuit comprising said amplifier 41 and resistor 42 corresponds to one unit. The potentiometer 39 may be designed to permit its manual adjustment by the operator of the grinding machine, for example by means of a control knob movable along a scale displaying the billet heights. In this case, by rotating manually the control knob the operator can introduce into the computer 35 the information corresponding to the height b of the billet to which the grinding operation is applied. In a modified embodiment, the sliding contact of potentiometer 39 may be coupled mechanically to the shaft 13a of arm 13 (FIG. 1) as in the case of potentiometer 16 of FIG. 3. According to another embodiment, the potentiometer 39 may be constructed as a linear potentiometer as shown diagrammatically in FIG. 1. More particularly, the resistive track of potentiometer 39 may be carried for example by the body of cylinder 14, and the sliding contact of this potentiometer may be connected mechanically to the piston rod of cylinder 14, the assembly being such that the resistance of potentiometer 39, as measured between its sliding contact and one of its two ends, varies substantially in proportion to the height or width $b$ of the square section billets 8 disposed between the shoulder 9a of table 9 and the holding bar 12. If the billet heights $b$ are below a predetermined value, for instance 70 millimeters, and in order to simplify the circuit means, $b$ may be considered as a constant, the error resulting therefrom being extremely small. From a practical point of view, this can be obtained by short-circuiting a portion of the resistive track of potentiometer 39, for example by means of a conducting wire 43 as illustrated in FIG. 2.

The computer 35 may consist for example of a conventional-type algerbraic adder, which is adapted to calculate the value $c$ of the billet radius according to the above formula (1). More particularly, the computer 35 delivers from direct current voltages fed to its first, second, third and fourth inputs a direct current voltage proportional to the value $c$. In an actual device constructed by the Applicant in accordance with the teachings of the invention a 5 voltage was obtained with a worn grinding wheel and a 10-V voltage was obtained with a new grinding wheel. However, most electronic speed variators used in actual practice for varying the rotational velocity of a motor must be supplied with a control voltage varying in the same direction as the desired rotational speed variation. Now, the greater the degree of wear of a grinding wheel, the higher the rotational speed of said wheel if a constant or substantially constant peripheral velocity is required. Therefore, the control voltage fed to the speed variator must increase as the grinding wheel surface wears down. Consequently, in actual practice the computer 35 is also provided with a fifth input to which a $-$ 15 V d.c. voltage is fed. Said last-mentioned voltage is added algebraically to the voltage obtained from the other four inputs, so that a $-$ 5 V voltage is obtained with a new grinding wheel and a $-$ 10 V voltage is obtained while using a worn grinding wheel. Moreover, the resulting voltage has its sign reversed by means of a suitable amplifier provided in the computer 35, whereby a $+$ 5 V voltage is obtained at the output of computer 35 with a new grinding wheel and a $+$ 10 V voltage is obtained at said output with a worn grinding wheel, the output voltage of computer 35 varying of course between these two limit values as the wheel wears down.

The voltage available at the output of computer 35 is stored in a memory 44 of a type having preferably a short storage time and a very low drift per time unit. This memory 44, which may consist for example of a storage marketed under reference "1238 A" by the "Techniques d'Automatisme," a French Corporation, comprises two control inputs, i.e. a first input adapted to receive a resetting signal RAZ, and a second input adapted to receive a write control signal. As already explained in the foregoing, in order to have the certainty that the measurement is taken when the point of contact between the grinding wheel and the top surface of the billet 8 lies in a flat portion of said top surface, the measurement should be made for a predetermined value $\omega_0$ of angle $\omega$. Therefore, means are provided for generating a write control signal when the value of angle $\omega$ is coincident with the predetermined value $\omega_0$. Said control signal generating means may consist for example of a comparator 45 (FIG. 2) having a first input connected to the output of amplifer 26 and a second input connected to a d.c. reference voltage source providing a reference voltage representative of the predetermined value $\omega_0$ of angle $\omega$. Said source of reference voltage may consist for example of a potentiometer 46 having its two ends connected to the ground and to a source of d.c. voltage, respectively, said d.c. voltage source being for example $+$ 10 V source. The sliding contact of potentiometer 46 is connected to a second input of comparator 45. The potentiometer 46 may be manually adjusted by an operator so that, when necessary, the predetermined value $\omega_0$ can be set as a function of the dimensions of the billet to be ground.

The output of comparator 45 is connected via normally open contacts 47 of a current relay to the write control input 48 of storage 44. The coil 49 of this current relay is connected electrically so as to be supplied with a current equal or proportional to the current supplied to the motor driving the grinding wheel 1, and the current relay is so arranged that its movable contact closes the circuit when the intensity of the current flowing through the coil 49 is relatively high, i.e. when the current flowing through the grinding-wheel driving motor is relatively strong as a consequence of the high load applied thereto by the grinding effort exerted on the wheel proper, and that said movable contact opens the circuit when the coil 49 is supplied with a relatively low current, i.e. when no grinding force or action is exerted by the wheel 1. Therefore, the write control signal fed to the storage 44 actually consists of the sum of the two data corresponding to the fact that the value of angle $\omega$ is coincident with the predetermined value $\omega_0$ and to the fact that the grinding wheel is operating, respectively. Each time the write control input 48 is validated, the memory 44 stores a value proportional to the radius of the grinding wheel and delivers permanently at its output S (as long s no signal is fed to its resetting input RAZ) a voltage proportional to the wheel radius, and this voltage may be used for adjusting the rotational velocity of the wheel 1.

The resetting signal RAZ is generated automatically when the grinding machine is powered off preliminary to the substitution of a new wheel for a worn one, this replacement implying necessarily the switching off of the device. The memory or storage 44 is so arranged that when its resetting input is validated by a resetting signal, it delivers at an auxiliary output 51 a d.c. voltage, for instance a $+$ 10 V voltage. This direct current voltage is fed to one end of a potentiometer 52 having its other end grounded and its movable contact coupled electrically to the output S. The movable contact of potentiometer 52 is so adjusted as to deliver at said output S (when the resetting input of memory 44 has been validated) a d.c. voltage, for instance 5 V, corresponding to a low rotational velocity of the grinding wheel driving motor, i.e. for a great wheel diameter (new grinding wheel). With this arrangement, when restarting the machine, the grinding wheel will rotate at a reduced speed, irrespective of the wheel diameter, thus preventing any risk of bursting a new wheel as a consequence of an excessive rotational speed thereof when re-starting the machine. Then, when the grinding operation begins and the angle $\omega$ attains the predetermined value $\omega_0$, the device of the invention will so control the speed variator of the grinding wheel driving motor that the wheel will rotate at a velocity corresponding to or consistent with its actual diameter.

The signal available at output S of memory 44 may, according to the type of speed variator utilized, be fed to the variator either directly or through a circuit of the type illustrated in FIG. 4, which permits a galvanic insulation between the memory 44 and the variator. Assuming that the variator 53 illustrated in FIG. 4 is of a type having no internal memory, a control voltage must be applied permanently its input. This can be obtained by using the electromechanical re-copying device illustrated in FIG. 4, which is similar to the device 29, 31 and 32 of FIG. 2. More particularly, this electromechanical re-copying device comprises a comparator 54 receiving at one of its inputs the signal available at the output S of memory 44. The output signal of comparator 44 is utilized for energizing a re-copying motor 55 having its output shaft coupled mechanically to the rotating shaft of a dual rotary potentiometer 56 having its two resistive tracks 56a and 56b electrically connected in parallel between the ground and a source of d.c. voltage, for example a + 10 V source. The sliding contact associated with track 56a is connected electrically to the second input of comparator 54, and the sliding contact associated with track 56b is connected electrically to the speed variator 53 which, in response to the voltage available at the sliding contact associated with track 56b, will adjust the supply voltage fed to motor 57 driving the grinding wheel. The dual rotary potentiometer 56 or at least the track 56b thereof may be an integral part of the speed variator 53.

The device described hereinabove with reference to FIGS. 1 – 4 of the drawings operates as follows:

After having disposed a billet 8 upon the table 9, the operator adjusts the potentiometer 39 to a value corresponding to the height $b$ of said billet, unless this adjustment is performed automatically as explained in the foregoing. likewise, if required by the particular dimensions of the billet 8, the operator also adjusts the potentiometer 46 to a value corresponding to a predetermined angular value $\omega_0$ such that, for said predetermined value, the point of contact between the grinding wheel 1 and the top surface of the billet lies with certainty in a flat portion of said top surface. Furthermore, it will be assumed that the adjustable resistors 34, 37 and 38 have been preset as a function of the fixed parameters $L_1$, $L_2$ and $M$ of the machine. Then the operator starts the machine and during each pass accomplished by the grinding wheel 1 on the top surface of the billet the potentiometer 16 and the dual potentiometer 25a, 25b will measure the angles $\omega_1$ and $\omega$, respectively, and at the same time the computer 35 will deliver a d.c. voltage proportional to the wheel radius, said voltage being stored in the memory 44 and updated each time the angle $\omega$ assumes a value coincident with the predetermined value $\omega_0$. The voltage read-out from memory 44 is utilized for controlling the speed variator of the wheel driving motor in order to control accordingly the speed of rotation of the grinding wheel. Since the operator controls the machine in such a manner that the wheel accomplishes two passes per billet face (i.e. one pass in each direction), the angle $\omega$ will pass through or assume the predetermined value $\omega_0$ twice per face, so that eight measurements of the wheel radius will be obtained for each billet. Due to the relatively slow rate of wear of the grinding wheel, this measuring procedure may be assimilated to a continuous measurement, whereby the speed of rotation of the grinding wheel can be subordinated continuously to the radius thereof.

In the specific embodiment described hereinabove the variation in the voltage available at the output of computer 35, which is a linear function of the voltage corresponding to the radius of the grinding wheel and obtained from the four voltages applied to the first, second, third and fourth inputs of computer 35, respectively, does not permit of keeping the peripheral speed of the wheel at a strictly constant value. This is due to the fact that, for a given peripheral speed, the angular speed of the wheel is inversely proportional to the wheel radius. However, experience teaches that in the range of operation of the device of this invention the relative error introduced by linearizing the speed control does not exceed about 3 percent, which remains within reasonable limits when regulating the rotational speed of a grinding wheel. Nevertheless, it is obvious that steps could be taken in order to keep the peripheral speed of the grinding wheel at a strictly constant value, for example by treating the voltage available at the output of computer 35 in a static multiplier-divider circuit.

Figure 5:
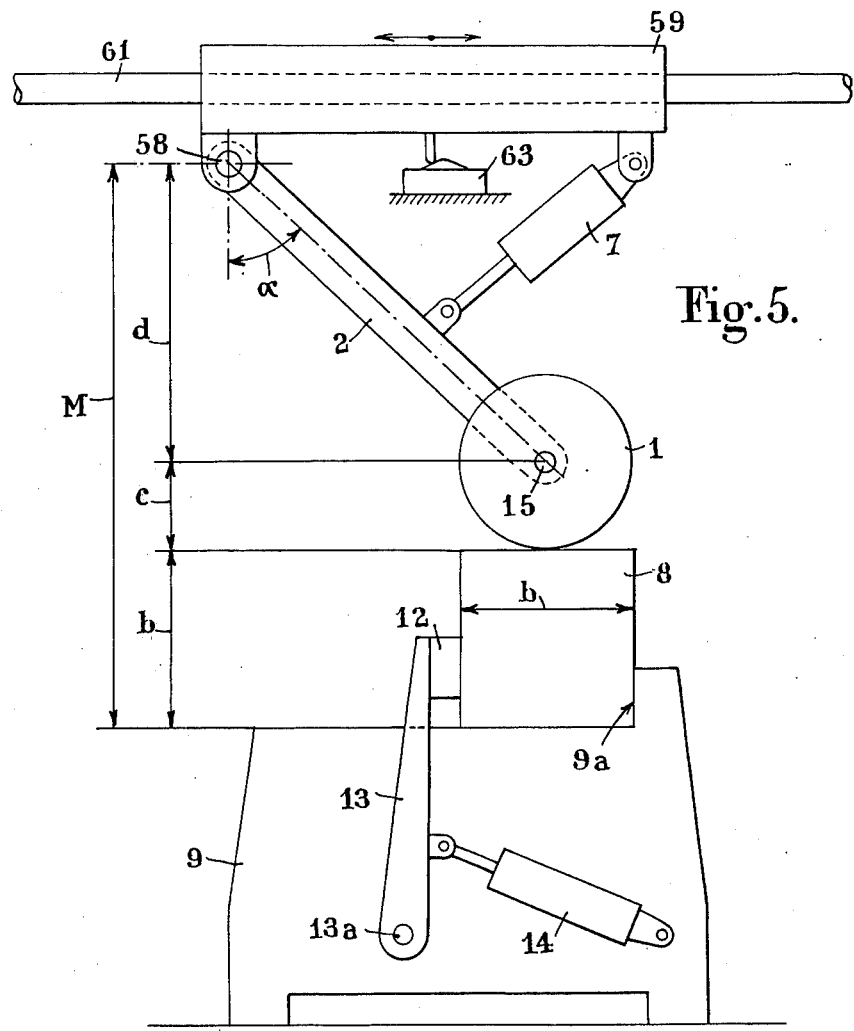
FIG. 5 illustrates another embodiment of a billet-type crack-removing machine to which the present invention is also applicable.

Now a modified embodiment of this invention, applicable more particularly to a grinding machine, for example a billet crack-removing machine, wherein the grinding wheel is supported by a single pivoting arm, will be described with reference to FIG. 5, in which the same components or components having the same functions as those illustrated in FIG. 1 are designated by the same reference numerals. In this arrangement, the grinding wheel 1 is supported by one end of a single pivoting arm 2 having its opposite end pivoted by means of a pivot pin 58 to a carriage 59 adapted to move horizontally. This carriage 59 may be guided horizontally through any suitable means, such as at least one ball-type socket secured to the carriage 59 and adapted to slide on at least one horizontal guide bar 61. Moreover, the carriage 59 may be driven for horizontal movement through any suitable control means or actuators, for example a hydraulic or pneumatic cylinder, or a worm and nut device, a rack and pinion mechanism, etc. A cylinder 7 for causing the grinding wheel 1 to bear against the billet 8 or be lifted off said billet, has one end connected to the arm 2 and the other end connected to the carriage 59, as shown.

As in the case if the crack-removing machine illustrated in FIG. 1, the radius $c$ of the grinding wheel 1 may be calculated as a function of the angle $\alpha$ formed between the arm 2 and the vertical, as a function of the height $b$ of the billet and also of other fixed parameters of the machine. In fact, it will be readily apparent from FIG. 5 that the following relationships are obtained:

$$c = M - b - d$$

since $$d = L_1 \cos \alpha,$$

we have $$c = M - b - L_1 \cos \alpha$$

wherein $M$ and $L_1$ have the same meaning as in formula (1) hereinabove.

FIG. 6 shows the block diagram of a device according to the present invention, which is intended for delivering an electric signal proportional to the radius of the grinding wheel for subordinating the rotational speed of the wheel to the value of said radius. As, in the modified embodiment illustrated in FIG. 5, it is only necessary to measure a single angle, consequently the construction of the device illustrated in FIG. 6 can be simplified considerably with respect to the arrangement shown in FIG. 2. More particularly, the device illustrated in FIG. 6 comprises the same component elements as those shown in FIG. 2, except for the potentiometers 16, 25a, 25b and 46, amplifiers 22, 26 and 36, variable resistors 23, 27, 28 and 37, computer unit 24, comparator circuits 29 and 45, and re-copying motor 31. Moreover, the rotating shaft of the dual rotary potentiometer 32a, 32b is connected through mechanical means to the shadt 58 pivoting the arm 2 to carriage 59, and only the track 32b of this dual potentiometer is utilized. Finally, in the device illustrated in FIG. 6, the second input of computer 35 is not utilized. On the other hand, in order to be sure that the radius is measured when the point of contact between the grinding wheel and the top surface of the billet lies in a flat portion of said top surface, the write control input 48 of memory 44 is connected via contacts 47 of a current relay to a write control signal source 62. Said write control signal source 62 may consist for example of a d.c. source and a microswitch 63 (FIG. 5) associated with said source and interposed in the path of carriage 59 so as to be actuated thereby for connecting the d.c. voltage source to said input 48 when the carriage 59 is in a predetermined position.

Otherwise, the device illustrated in FIG. 6 operates exactly like the device illustrated in FIG. 2. Therefore, it is not deemed necessary to described its mode of operation in detail.

It will readily occur to those conversant with the art that the two embodiments described hereinabove with reference to the attached drawings are given by way of illustration, not of limitation, and that many modifications and changes may be brought thereto without departing from the basic principles of the invention. Thus, notably, in the above-described examples the angle ω was measured in relation to the horizontal and angle α in relation to the vertical, but it is clear that the reverse procedure (i.e. measuring angle ω in relation to the horizontal and angle α in relation to the vertical) could also be adopted since, as already explained in the foregoing, the only requirement to be met consists in modifying the initial angular setting of potentiometers 25a, 25b and 32a, 32b. In this case, both tracks 25a and 32b should be so arranged that d.c. voltages available on their relevant sliding contacts vary as the cosine on the angle complementary to angle ω illustrated in FIGS. 1 and 2, and as the sine of the angle complementary to angle α illustrated in FIGS. 1 and 2, respectively. According to a modified arrangement, instead of utilizing rotary potentiometers for the potentiometers 16 and the dual potentiometer 25a, 25b, single and dual linear potentiometers, respectively, mounted on cylinders 7 and 11, could be used, as in the case of potentiometer 39 shown in FIG. 1. According to another possible modification, for measuring the angles ω and ω₁ of FIGS. 1 and 2 or angle α of FIGS. 5 and 6, respectively, and generating an electric signal proportional to these angles, one could replace the above-described potentiometers with any other angle measuring instrument or device capable of delivering an electric signal proportional to the value of the measured angle, Thus, for instance, one could utilize as a measuring device a rotary disk provided with optical or magnetic reference marks disposed at spaced intervals along its outer periphery, in combination with an electro-optical or electro-magnetic pickup adapted to emit an electric pulse each time an optical or magnetic mark moves past said picup, these electric pulses being subsequently delivered to a computer or integrator delivering in turn at its output a d.c. voltage proportional to the number of pulses having thus moved past the pickup in relation to the disk. On the other hand, the − 15 V voltage fed to the fifth input of computer 35 (FIGS. 2 and 6) is required only in the specific case of the practical application contemplated hereinabove, and those skilled in the art will readily understand that this voltage could be dispensed within other application.

I claim:

1. Method of measuring the radius of a rotating grinding wheel without stopping the rotation of the grinding wheel and while said grinding wheel is moved back and forth across one face of a workpiece having a generally rectangular or square cross section of predetermined dimensions, said workpiece being supported by a generally flat support surface, said grinding wheel being supported by at least one pivoting arm of predetermined length and urged against said workpiece, said pivoting arm being pivoted at a point spaced a predetermined distance from said flat support surface, comprising the steps of measuring the value of the angle formed by said pivoting arm in relation to a fixed direction, generating an electric signal in relation to the measured angle value, feeding said electric signal to a computer together with other electric signals corresponding to the predetermined dimensions of the workpiece, to the predetermined length of said at least one pivoting arm and to said predetermined distance, respectively, in order to derive from all said signals an electric signal proportional to the radius of said grinding wheel, and memorizing said last-mentioned electric signal only when said grinding wheel is into engagement with said one face of the workpiece and each time said grinding wheel assumes a predetermined position during its back and forth movement across said one face of said workpiece.

2. Method according to claim 1, in which the grinding wheel is supported by a pair of pivoting arms each of a predetermined length and pivoted to each other through a common pivotal connection, a first one of said arms being pivoted to a fixed point which is spaced said predetermined distance from said flat support surface, and the other arm supporting the grinding wheel at its end opposite to the common pivotal connection between said arms, comprising the steps of measuring the value of a first angle formed between said two arms, producing a first electric signal representative of the measured first angle value, measuring the value of a second angle formed between said first and a fixed direction, generating a second electric signal representative of the measured second angle value, producing from said first and second signals a third signal representative of the value of a third angle formed between said second arm and a fixed direction, and feeding said second and third signal to said computer together with said other electric signals, including signals corresponding to the predetermined length of each of said two arms, in order to produce an electric signal proportional to the radius of said grinding wheel.

3. Method according to claim 2, wherein the signal proportional to the radius of said grinding wheel is memorized only when the second signal attains a predetermined value corresponding to a predetermined value of the measured second angle.

4. Device for measuring the radius of a grinding wheel while said grinding wheel is moved back and forth across one face of a workpiece having a generally rectangular or square cross section of predetermined dimensions, said workpiece being supported by a generally flat support surface, said grinding wheel being supported by at least one pivoting arm of predetermined length and urged against said workpiece, said pivoting arm being pivoted at a point spaced a predetermined distance from said flat support surface, comprising first means for measuring the value of the angle formed between said pivoting arm and a predetermined fixed direction and for generating an electric signal in relation to the measured angle value, second means for generating predetermined electric signals corresponding to the predetermined dimensions of the workpiece, to the predetermined length of said at least one pivoting arm and to said predetermined distance, respectively, a first computer for treating said electric signal and said predetermined electric signals for generating therefrom an electric signal proportional to the radius of said grinding wheel, third means for generating a first control signal each time said grinding wheel assumes a predetermined position during its back and fourth movement across said one face of said workpiece, fourth means for generating a second control signal indicating that said grinding wheel is into engagement with said one face of said workpiece, and storage means for storing said electric signal proportional to the radius of the grinding wheel in response to the presence of both said first and second control signals.

5. Device according to claim 4, wherein the grinding wheel is supported by a single pivoting arm, and wherein said first means is adapted to deliver an electric signal of a value proportional to one of the cosine and sine values of the angle formed by said pivoting arm with said fixed direction.

6. Device according to claim 5, wherein said first means comprises a rotary potentiometer having its sliding contact connected mechanically to a pivot shaft of the pivoting arm, and set to deliver at its sliding contact an output signal proportional to one of the cosine and sine values of said angle.

7. Device according to claim 4, wherein said grinding wheel is supported by a pair of pivoting arms each of a predetermined length and pivoted to each other through a common pivotal connection, a first one of the two arms being pivoted to a fixed point which is spaced said predetermined distance from said flat support surface, and the second arm supporting said grinding wheel at its end opposite said common pivotal connection of said first and second arms, and wherein said first means comprises first measuring means for generating a first electric signal proportional to the value of a first angle formed between said first and second arms, second measuring means for generating second and third signals proportional to the value of a second angle formed between said first arm and a fixed direction and to one of the sine and cosine values of said second angle, respectively, and a second computer unit for generating from said first and second signals a fourth signal in relation to a third angle formed between said second arm and a predetermined fixed direction, and wherein said third and fourth signals are fed to said first computer unit together with said predetermined electric signals, including signals corresponding to the predetermined length of each of said two arms, for generating therefrom said electric signal proportional to the radius of said grinding wheel.

8. Device according to claim 7, wherein said second computer unit comprises an algebraic adder receiving said first and second signals and adapted to produce an electric signal proportional to the value of said third angle formed between said second arm and said fixed direction, and means for producing from said last-mentioned signal a signal proportional to one of the cosine and sine values of said third angel as said fourth signal.

9. Device according to claim 8, wherein said producing means comprises a two input comparator receiving at one of its two inputs said signal proportional to said third angle formed between said second arm and said predetermined fixed direction, a re-copying motor energized by an output signal from said comparator, a pair of potentiometers having a common rotating shaft mechanically connected to the shaft of said re-copying motor, a first one of said potentiometers being arranged to deliver at its sliding contact an electric signal proportional to said third angle, the sliding contact of said first potentiometer being electrically connected to the second input of said comparator, the second potentiometer of said pair being arranged to deliver at its sliding contact said fourth signal.

10. Device according to claim 7, wherein said first measuring means comprises a first potentiometer having its sliding contact mechanically connected to a pivot shaft of said common pivotal connection interconnecting said two arms and adapted to delivery said first signal at its sliding contact, and wherein said second measuring means comprises a pair of potentiometers having a common rotating shaft which is mechanically connected to a pivot shaft pivoting said first arm to said fixed point, a first one of said pair of potentiometers being arranged to deliver said second at its sliding contact, and the second potentiometer of said pair being arranged to deliver said third signal at its sliding contact.

11. Device according to claim 4, wherein said storage means comprises a memory for storing the output electrical signal from said first computer, said memory comprising a resetting input, a write control input for receiving a combination of said first and second control signal, and a pair of outputs, said memory being adapted to deliver a signal of predetermined value on a first of its two outputs when its resetting input is validated by a resetting signal, and to deliver a signal corresponding to the content of said memory at its second output when no resetting signal is fed to its resetting input.

12. Device according to claim 11, further comprising an electric motor for driving said grinding wheel, a source of write control signal as said means for generating said first control signal, a current relay as said means for generating said second control signal for connecting, when energized, said source of write control signal to the write control input of said memory, said current relay having a coil supplied with a current, which is in relation to an energizing current supplied to the motor driving said grinding wheel.

13. Device according to claim 12, wherein said source of write control signal comprises a d.c. voltage source and switch means which, when closed, connects said d.c. voltage source to the write control input of said memory through said current relay, said switch means being disposed so as to be actuated each time said grinding wheel assumes said predetermined position.

14. Device according to claim 12, wherein said source of write control signal comprises a two input comparator receiving at its two inputs said second signal and a voltage of predetermined value, respectively, said comparator producing at its output a write control signal when said second signal has a value coincident with that of said predetermined voltage.

* * * * *